(12) United States Patent
Jones (10) Patent No.: US 9,035,201 B2
(45) Date of Patent: May 19, 2015

(54) FLUSH FLOOR BOX (71) Applicant: Tyco Electronics Corporation, Berwyn, PA (US)

(72) Inventor: Sarah Jean Jones, Kernerville, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 68 days.

(21) Appl. No.: 13/855,982

(22) Filed: Apr. 3, 2013

(65) Prior Publication Data

US 2013/0264108 A1    Oct. 10, 2013

Related U.S. Application Data (60) Provisional application No. 61/620,250, filed on Apr. 4, 2012.

(51) Int. Cl.
*H02G 3/12* (2006.01)
*H02G 3/08* (2006.01)
*H02G 3/18* (2006.01)

(52) U.S. Cl.
CPC .. *H02G 3/12* (2013.01); *H02G 3/08* (2013.01); *H02G 3/185* (2013.01)

(58) Field of Classification Search
CPC ........... H02G 3/08; H02G 3/081; H02G 3/12; H02G 3/121; H02G 3/22; H02G 3/185; H05K 5/00; H05K 5/0004; H05K 5/02; H05K 5/0204; H05K 5/0247

USPC ......... 174/50, 53, 57, 58, 480, 481, 482, 483, 174/484, 486, 487, 490, 502, 503, 520, 559, 174/560, 561, 59; 220/3.2–3.9, 4.02; 439/535, 949; 52/220.1, 220.8
See application file for complete search history.

(56) References Cited

U.S. PATENT DOCUMENTS

| 5,257,487 | A  | * | 11/1993 | Bantz et al. .................. 174/486 |
| 7,045,706 | B1 |   | 5/2006  | Lincoln, III et al. |
| 7,075,005 | B1 | * | 7/2006  | Drane .............................. 174/50 |
| 7,989,710 | B2 | * | 8/2011  | Hansen et al. ................ 174/482 |
| 8,153,910 | B1 | * | 4/2012  | Penczak ........................ 174/486 |
| 8,519,276 | B2 | * | 8/2013  | Isaacks et al. ................ 174/486 |

OTHER PUBLICATIONS

Tyco Electronics, NETCONNECT Undercarpet Leveling Ring and Activation Kit Instruction Sheet 408-10141, Rev C, Apr. 15, 2008.

* cited by examiner

*Primary Examiner* — Angel R Estrada
(74) *Attorney, Agent, or Firm* — Merchant & Gould P.C.

(57) ABSTRACT

The present disclosure relates to a flush floor box that can be constructed at a lower cost and is easier to install than previously utilized flush floor boxes. The flush floor box includes a base and/or a leveling ring with integral features. The integral features help to reduce the cost of producing the flush floor box. The leveling ring can include ears/tabs for use in electrically grounding a top shield of a flat floor power cable.

20 Claims, 11 Drawing Sheets

FLUSH FLOOR BOX

CROSS-REFERENCE TO RELATED APPLICATION

The present application claims the benefit of U.S. Provisional Patent Application Ser. No. 61/620,250, filed Apr. 4, 2012, which application is hereby incorporated by reference in its entirety.

TECHNICAL FIELD

The present disclosure relates to a flush floor box, and more specifically to a flush floor box with a base and leveling ring.

BACKGROUND

In-floor service distribution systems (or floor boxes) for concrete slab floors are assembled on a deck sheet of floor form and cast into the floor slab. The floor boxes must be concrete tight (i.e., fluid tight) to prevent partial or complete filling of parts of the system by concrete seeping into the distribution system before setting of the slab. Thereafter, the surrounding concrete supports and reinforces the floor boxes.

Floor boxes, are typically positioned in a concrete floor slab closely below the upper floor surface and are constructed to accept a floor cable. Concrete floor slabs may be of various depths or thicknesses. Accordingly, the height of floor boxes may be adjustable. This adjustment allows the floor box to be positioned flush with the floor surface. However, current floor boxes are expensive to manufacture and may be difficult for a technician to level and/or install.

SUMMARY

One aspect of the present disclosure relates to a flush floor box that can be constructed at a lower cost and is easier to install than previously utilized flush floor boxes. The flush floor box includes a base and/or a leveling ring with integral features.

The integral features help to reduce the cost of producing the flush floor box. The flush floor box may include apertures in the leveling ring that provide access to leveling screws in the base used to level the leveling ring. Grounding tabs for electrically connecting the top shield of a flat floor power cable to the flush floor box may be provided as part of the leveling ring. Once leveled, the leveling ring may be fastened to the base by a plurality of fasteners that also function to provide an electrical connection between the leveling ring and the base. A discrete grounding location can be provided as part of the base for electrically connecting the base to a grounding wire of the flat floor power cable through the use of a grounding lead. The discrete grounding location may be integrated into a corner tab of the base that also supports one of the leveling screws. A cover may be mounted over the leveling ring to enclose a top side of the flush floor box. A power outlet may be secured to an underside of the cover. The power outlet may be accessible from a top side of the cover. Sealing layers may be positioned between the leveling ring and the base and between the cover and the leveling ring. Fasteners may be used to secure the cover to the leveling ring and/or the base and to provide an electrical connection between the cover and the base and/or the leveling ring. The electrical connections between the top shield of the flat floor cable and the various metal components of the flush floor box allow the top shield and the various metal components of the flush floor box to be electrically bonded to an effective ground fault current path. The ground fault current path can include the ground wire of the flat floor power cable.

Another aspect of the present disclosure relates to a flush floor box that includes a base, leveling screws, a rectangular leveling ring, first fasteners, a rectangular cover, and second fasteners. The base includes a rectangular housing having integral corner tabs adjacent each corner of the base. The leveling screws are threaded into openings defined within the integral corner tabs. The rectangular leveling ring rests on the leveling strews and includes leveling screw access openings for accessing the leveling screws through the leveling ring. The leveling ring includes a major side and a minor side. The leveling ring also includes at least two integral ears/tabs that project inwardly and downwardly from at least one of the major sides of the rectangular leveling ring. The integral angled ears allow a top shield of a floor cable to be electrically connected to the leveling ring for grounding purposes. The leveling screw access openings align with the leveling screws and are configured to provide access through the rectangular leveling ring to the tops of the leveling screws. For example, a screw driver can be inserted through the leveling screw access openings and used to selectively thread or unthread to the leveling screws to level the leveling ring. The leveling screws are configured to raise or lower the rectangular leveling ring within the base while the rectangular leveling ring rests on the leveling screws. The first fasteners can secure the rectangular leveling ring to the base after leveling. The rectangular cover covers at least a portion of the base and forms a top side of the flush floor box. The second fasteners secure the cover to the leveling ring and/or the base.

A further aspect of the present disclosure relates to flush floor box. The flush floor box includes a base, a leveling ring, and a cover. The base includes a plurality of tabs. At least one of the plurality of tabs includes a discrete ground connection location. The discrete ground connection location is configured to be electrically connected to a ground wire of a floor cable such that the flush floor box is electrically bonded to an effective ground fault current path. The leveling ring is adjustably attached to the base. The leveling ring includes at least two ears. The at least two ears are configured to attach to a top shield of the floor cable for electrically connecting the top shield of the floor cable to the flush floor box. The cover mounts over the leveling ring and the base and forms a top side of the flush floor box.

A variety of additional aspects will be set forth in the description that follows. These aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
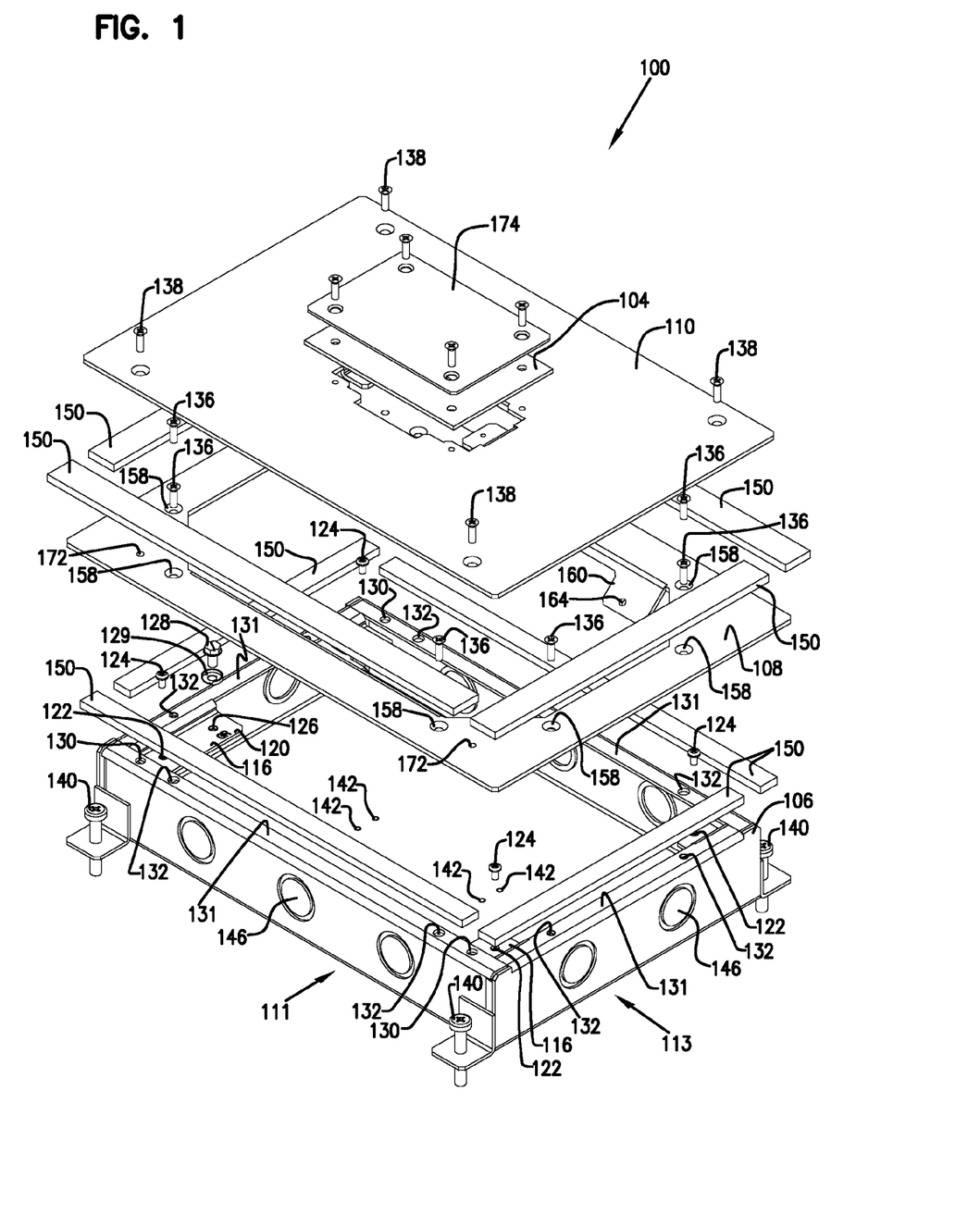
FIG. 1 is an isometric, exploded view of an embodiment of a flush floor box in accordance with the principles of the present disclosure.
Figure 2:
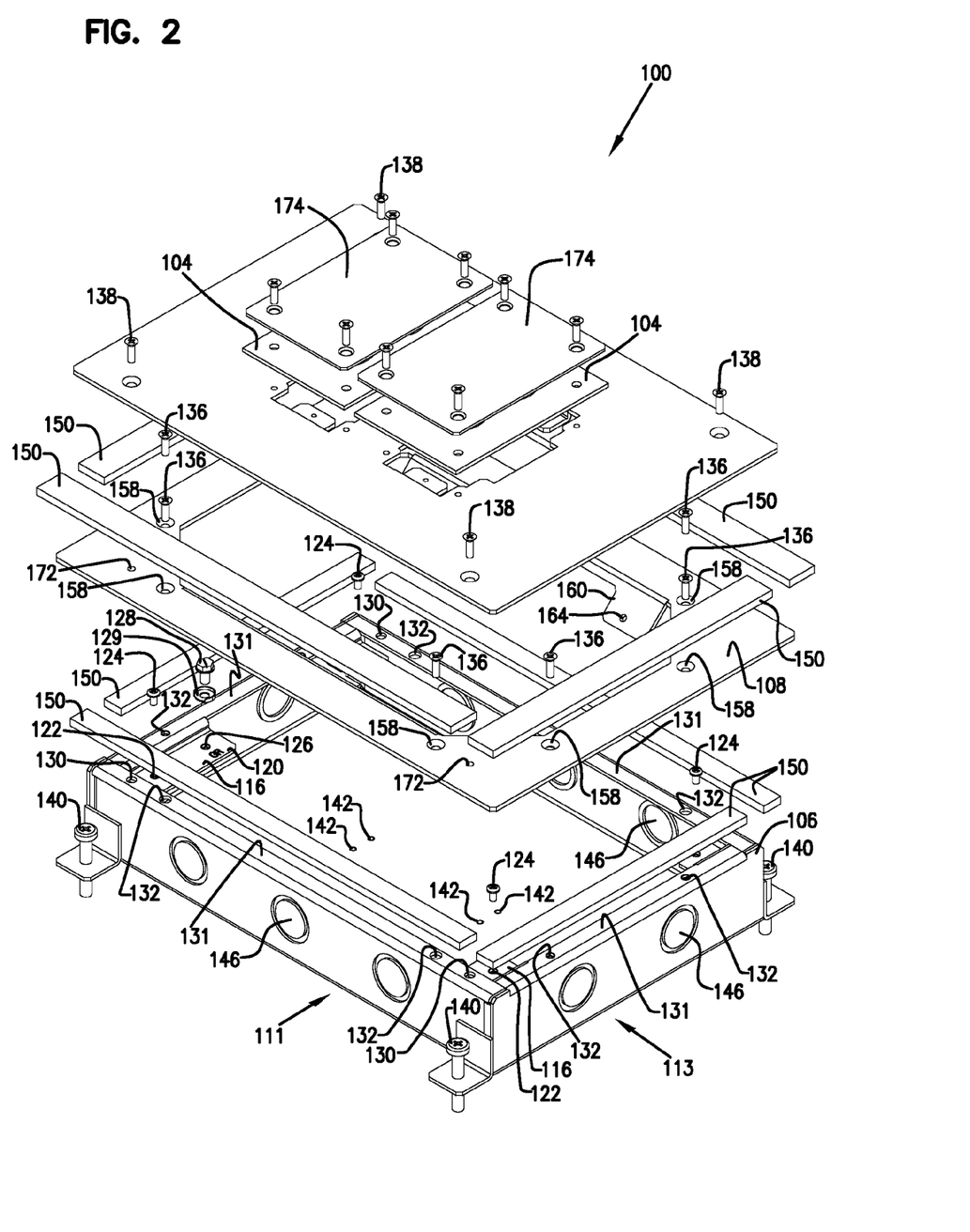
FIG. 2 is an isometric, exploded view of an embodiment of a flush floor box in accordance with the principles of the present disclosure.
Figure 10:
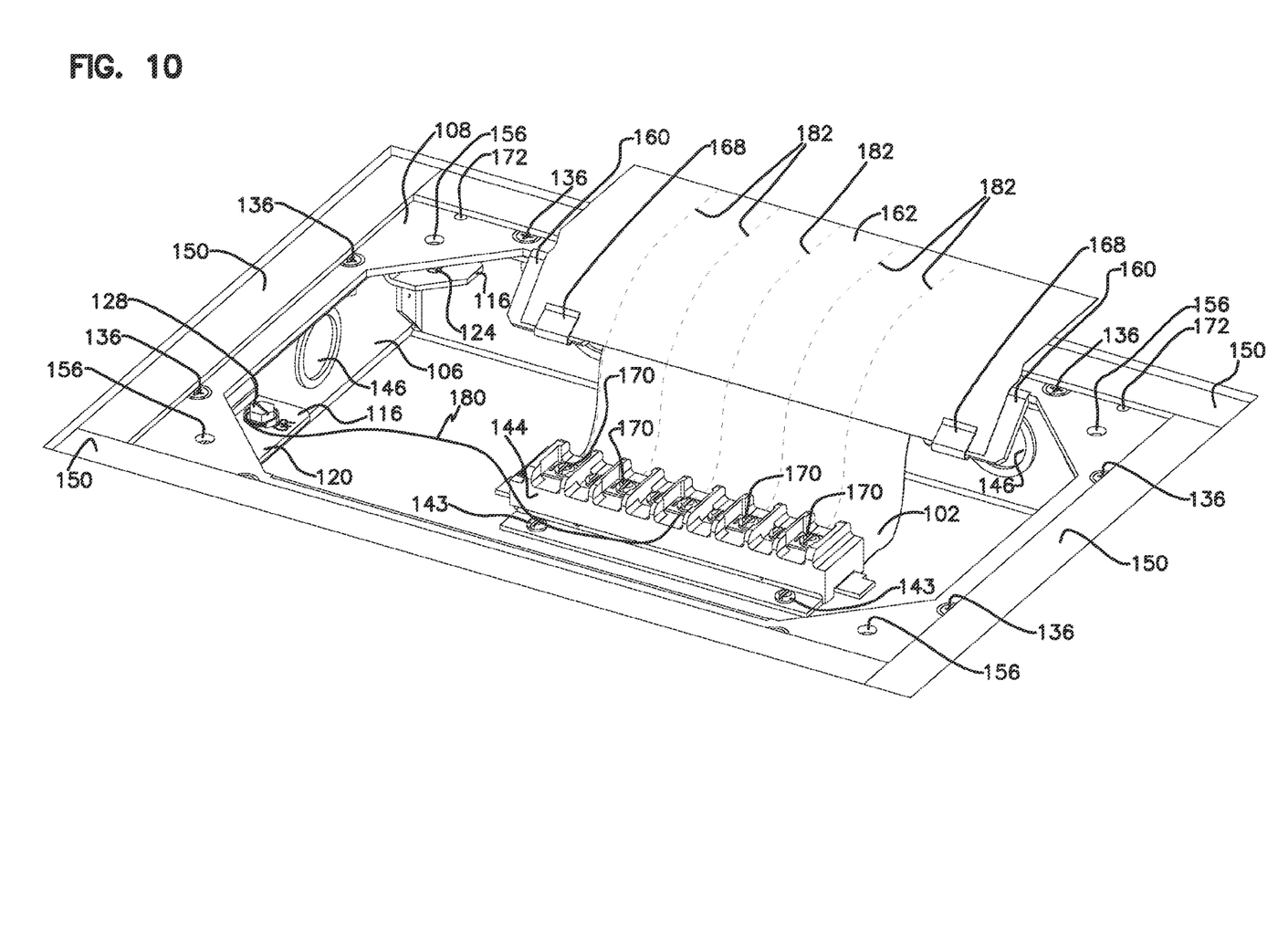
FIG. 10 is an isometric view of an embodiment of a base, a leveling ring, an attached floor cable, and a transition block of a flush floor box in accordance with the principles of the present disclosure.
Figure 11:
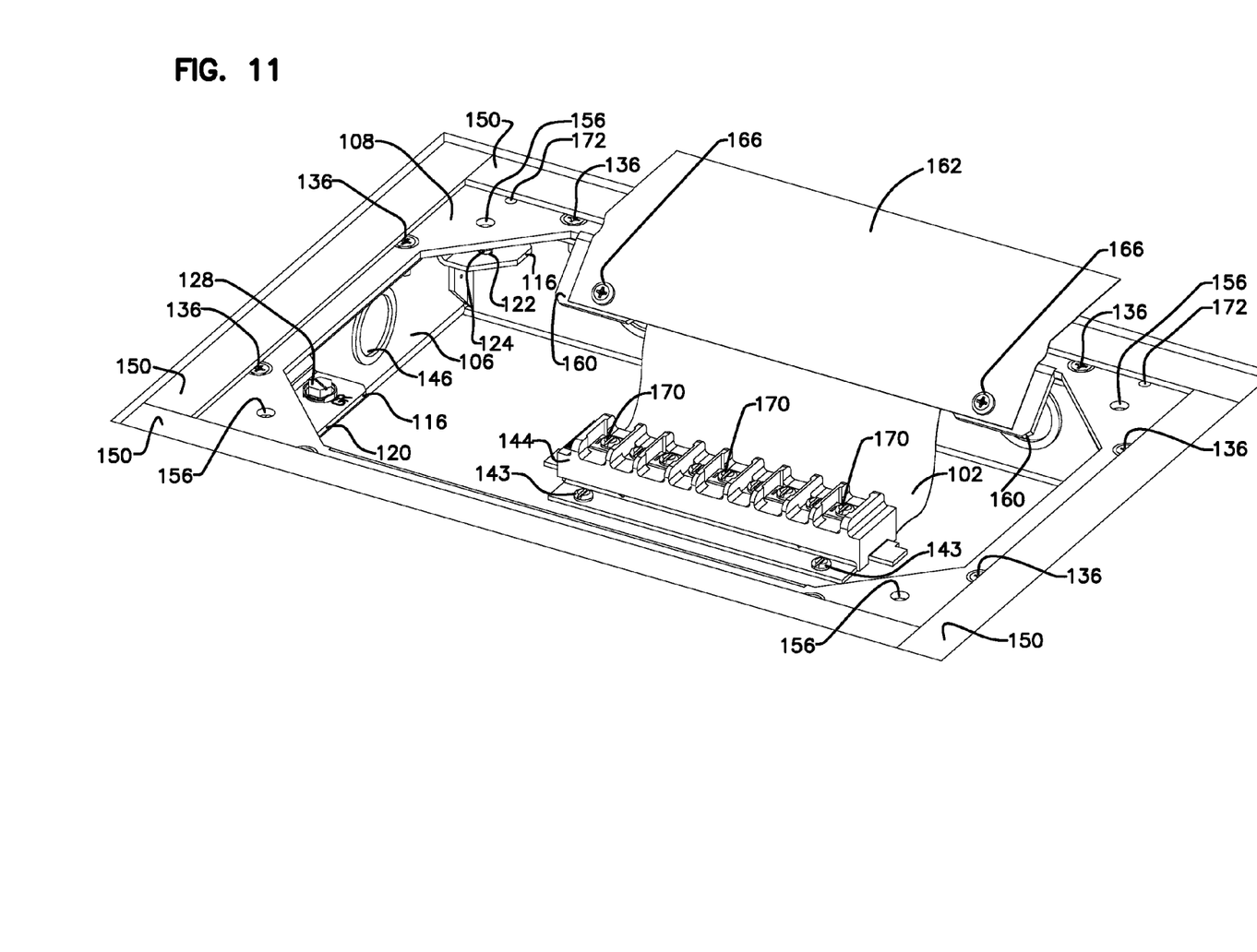
FIG. 11 is an isometric view of an embodiment of a base, a leveling ring, an attached floor cable, and a transition block of a flush floor box in accordance with the principles of the present disclosure.

FIGS. 1-2 illustrate embodiments of a flush floor box 100 in accordance with the principles of the present disclosure. The flush floor box 100 is positioned in a concrete floor slab and is flush or about flush with the upper floor surface. Concrete is poured around the flush floor box 100 to anchor the flush floor box 100 into the floor. The flush floor box 100 is constructed to accept a floor cable 102 as illustrated in FIGS. 10 and 11. In some embodiments, the floor cable 102 is a flat floor cable 102. The flush floor box 100 is further constructed to accept a communication cable. In some embodiments, the flush floor box 100 is configured to accept a power cord through a side of the flush floor box 100 (e.g., through a punch-out/knockout location). In one application, the power cord connects to the floor cable 102 within the flush floor box 100. In another application, the flush floor box 100 allows a technician to install at least one outlet into the floor via the flush floor box 100 by connecting the outlet to the floor cable 102 and/or a communication cable within the flush floor box 100.

Figure 3:
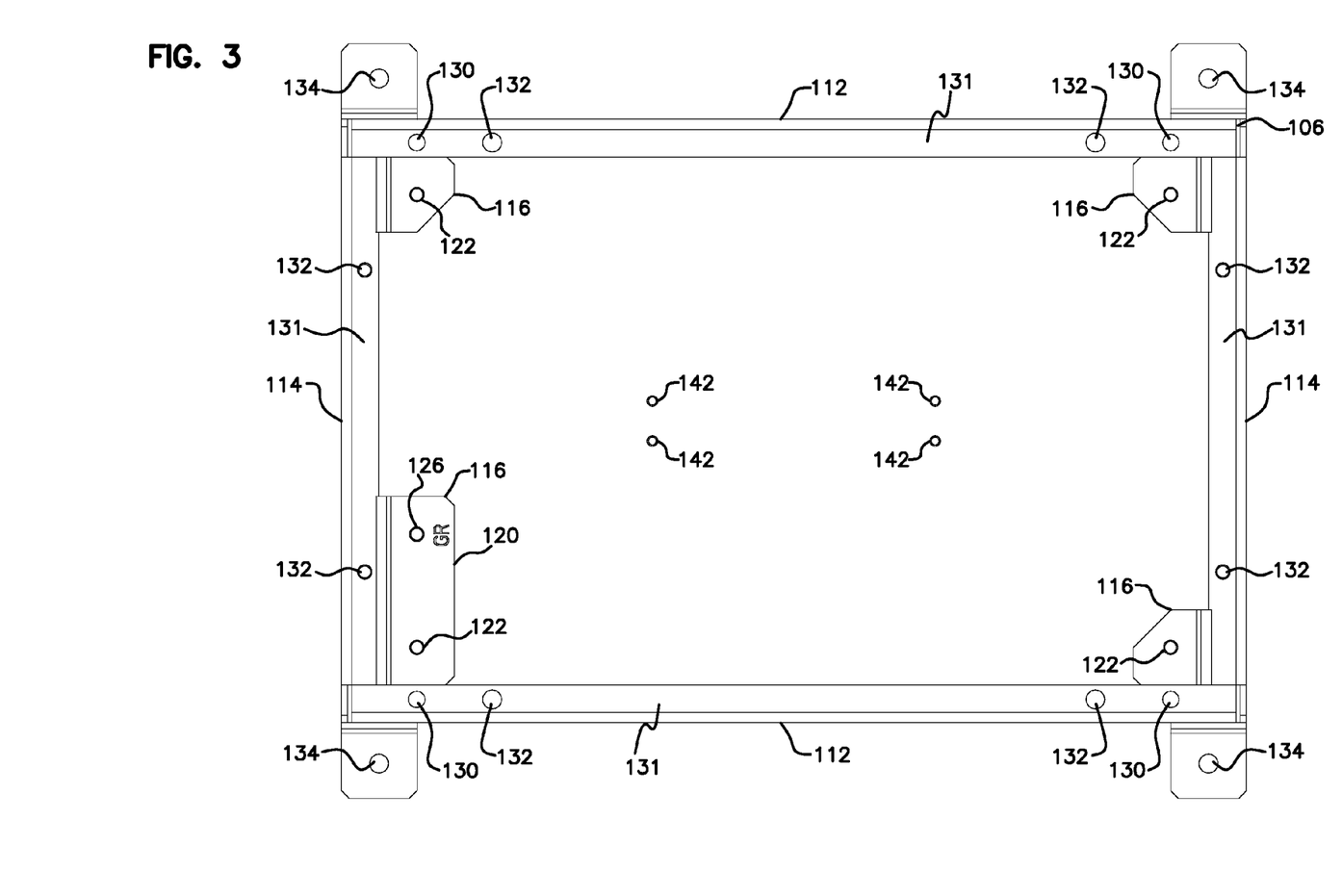
FIG. 3 is a planar, top view of an embodiment of a base for a flush floor box in accordance with the principles of the present disclosure.
Figure 4:
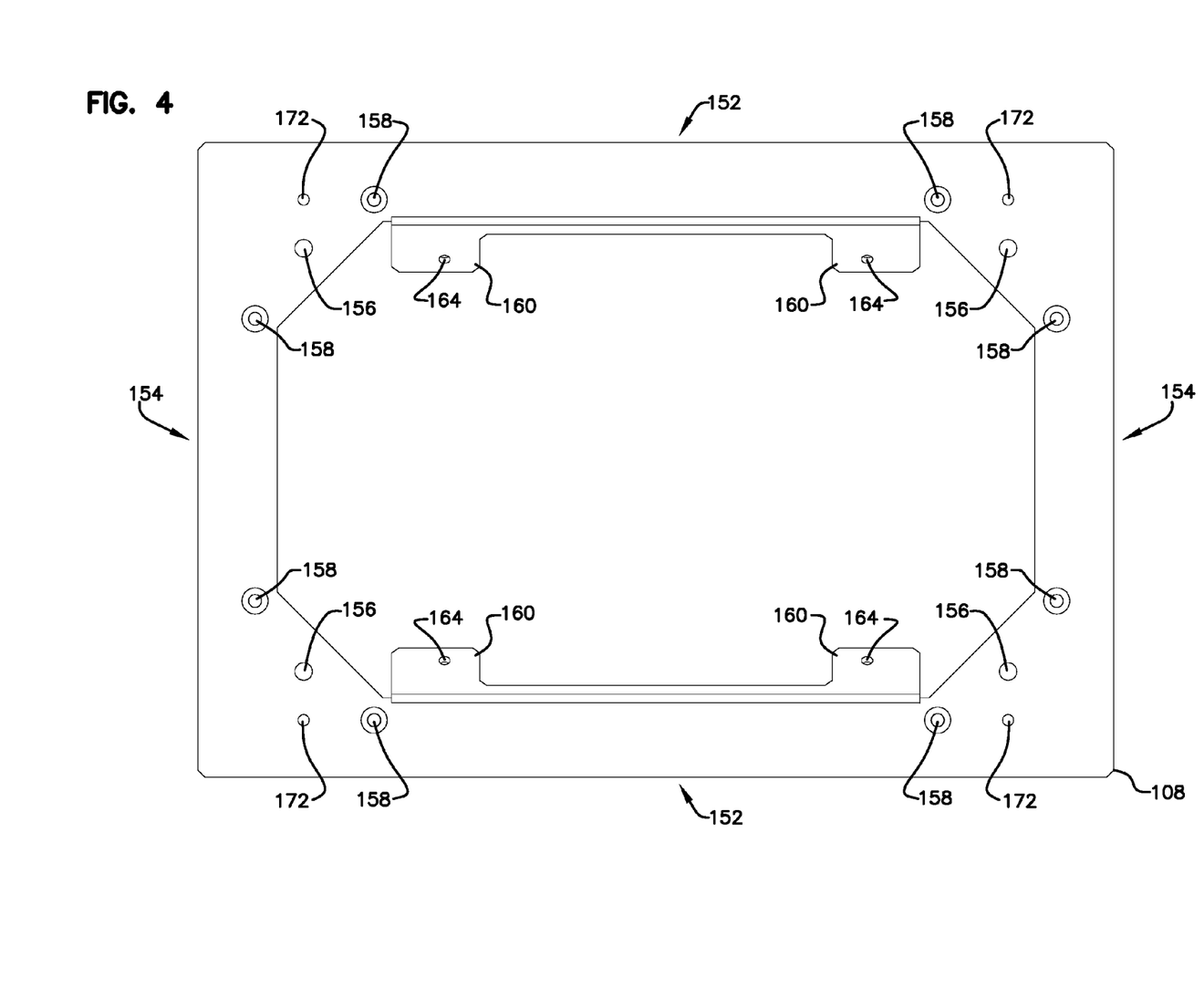
FIG. 4 is a planar, top view of an embodiment of a leveling ring for a flush floor box in accordance with the principles of the present disclosure.
Figure 5:
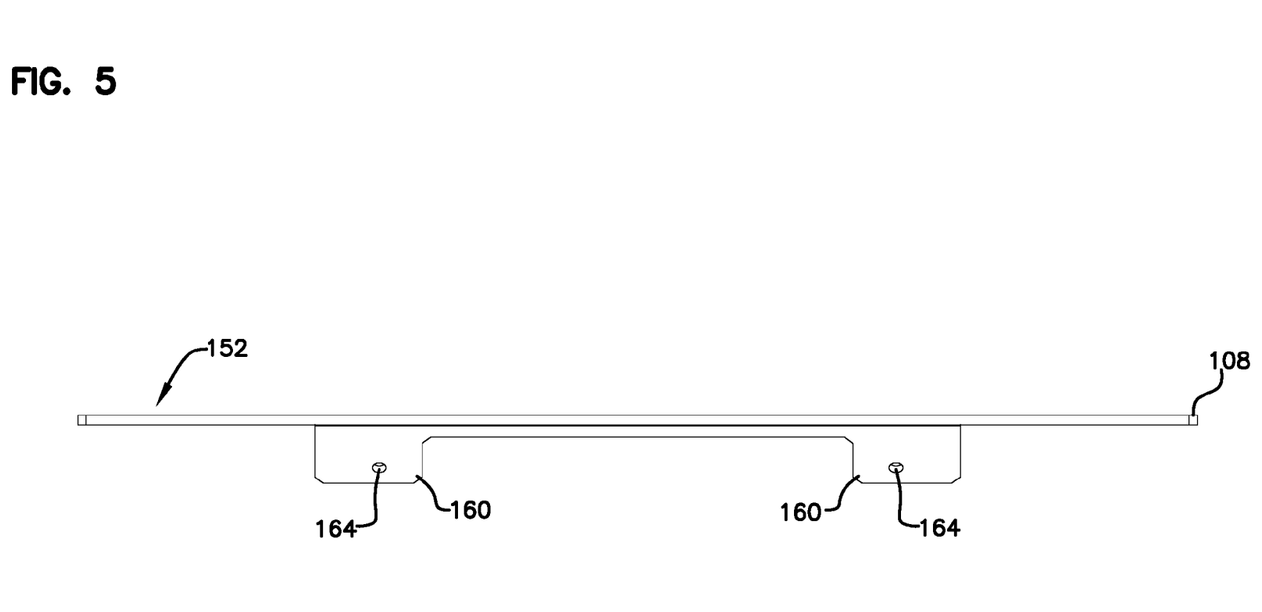
FIG. 5 is a planar, side view of an embodiment of a leveling ring for a flush floor box in accordance with the principles of the present disclosure.
Figure 6:
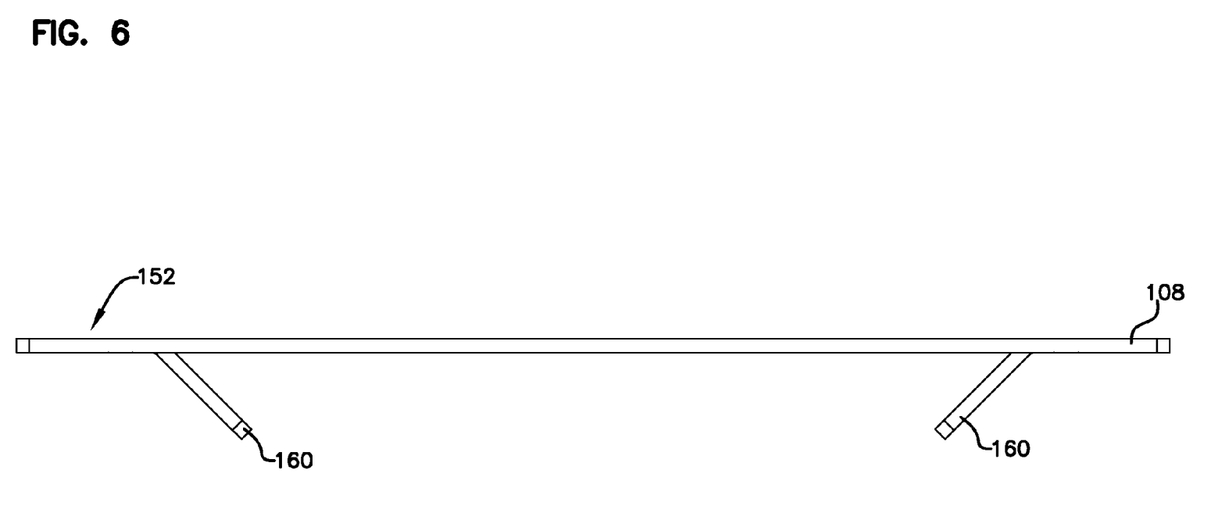
FIG. 6 is a planar, end view of an embodiment of a leveling ring for a flush floor box in accordance with the principles of the present disclosure.

The flush floor box 100 includes a base 106, leveling ring 108, and cover 110. FIG. 3 illustrates a top, planar view of the base 106. FIGS. 4, 5, and 6 illustrate different planar views of the leveling ring 108. The cover 110 or top cover 110 is illustrated in FIGS. 1 and 2.

The base 106 is a rectangular housing. The rectangular housing of the base 106 includes two major sides 112 and two minor sides 114. The rectangular housing of the base 106 is concrete tight and prevents concrete from seeping into the interior of the base 106 during installation. The base 106 includes inner tabs 116. In some embodiments, the inner tabs 116 are corner tabs 116 in each corner of the base 106. In one embodiment, the inner tabs 116 are integral with a main body of the base 106. As used herein, components are integral when they are formed as one piece. For example, the inner tabs 116 and the base 106 may be formed via a stamping process from one piece of metal. The inner tabs 116 include screw apertures 122 (i.e., internally threaded openings) for receiving leveling screws 124. Leveling screws 124 are threaded at least partially into screw apertures 122 of the inner tabs 116 of the base 106. As used herein, the term "screw" includes any type of threaded fastener.

In some embodiments, at least one of the inner tabs 116 is a grounding tab 120. The grounding tab 120 is larger than the other inner tabs 116 and provides a grounding aperture 126 for receiving a grounding terminal 128 that provides a discrete grounding location for electrically connecting the box 100 to an effective ground fault current path. For example, an intermediate wire 180 can be used to provide an electrical connection between the grounding terminal 128 and a ground wire of a floor cable 102 routed into the flush floor box 100. In the depicted embodiment, the grounding terminal 128 is a threaded fastener that is received by the grounding aperture 126. In some embodiments, a washer 129, such as a cup washer, is disposed between the grounding terminal 128 and the grounding tab 120.

The base 106 further includes one or more top flanges 131. In some embodiments, the one or more top flanges 131 are integral with the main body of the base 106. Accordingly, as discussed above, the one or more flanges 131 may be formed with the base 106 during a stamping process. In some embodiments, the base 106 includes a top flange 131 on each side of the base 106 as illustrated in FIGS. 1, 2, and 3.

The base 106 further includes apertures 130, 132, 134, and 142 for receiving various different fasteners (e.g., screws). Apertures 132 are defined through the top flanges 131 and receive first screws 136. The first screws 136 fasten the leveling ring 108 to the base 106. The first screws 136 can also electrically connect the leveling ring 108 to the base 106 for grounding/electrical bonding purposes. The apertures 130 are defined through the flanges 131 and receive second screws 138. The second screws 138 fasten the cover 110 to the base 106. The second screws 138 can electrically connect the cover 110 to the leveling ring 108 and/or the base 106 for grounding/electrical bonding purposes. Apertures 134 are defined through primary leveling tabs of the base 106 and are configured to receive floor screws 140 (i.e., primary leveling screws). The floor screws 140 anchor the base 106 to the floor. The floor screws 140 are covered up with concrete during the installation of the flush floor box 100. Apertures 142 are defined through a bottom/floor of the base 106 and are configured to receive transition block screws 143. In some embodiments, the transition block screws 143 anchor the transition block 144 to the base 106. In alternative embodiments, the transition block 144 is attached to base 106 via another fastening mechanism, such as tape or adhesive. In these embodiments, the apertures 142 may or may not be utilized to secure other component to the base 106. The base 106 and the cover 110 preferably have a metal (e.g., steel) construction.

In some embodiments, one or more of the apertures (122, 126, 130, 132, 134, and 142) of the base 106 include supplemental support, such as self-clinching nuts. One example of a self-clinching nut is a PEM ® fastener created by PennEngineering located at 5190 Old Easton Road, Danboro, Pa. 18916. In one example, the apertures 132 on the major side 112 of the base 106 include PEM ® fasteners while the remaining apertures (122, 126, 130, 132 on minor sides 114, 134, and 142) are tapped.

In some embodiments, the flush floor box 100 includes one or more knockout portions 146 in the sides of the base 106. In the depicted embodiments, the one or more knockout portions 146 are round. In some embodiments the knockout portions 146 are round and have a diameter of 0.875 inches, 1.109 inches, ½ inch, or ¾ inches. In further embodiments, the flush floor box 100 includes at least 10 knockout portions 146 in the sides of the base 106. The one or more knockout portions 146 are portions of the side of the base 106 that can be removed from the base 106. When a knockout portion 146 is removed, a hole/passage way is defined through the side wall of the base 106. During installation of the box 100, a conduit can be secured to the base 106 in alignment with the opening formed by the removed knockout portion 146. In this way, the conduit provides a concrete tight connection over the knockout portion 146. In some embodiments, a power cord is inserted through the conduit and into the flush floor box 100. The power cord may be connected to a floor cable 102 via a transition block 144 within the flush floor box 100.

In some embodiments, the flush floor box 100 receives a communication cable. The flush floor box 100 may receive a communication cable in addition to the floor cable 102 or instead of the floor cable 102. In some embodiments, the communication cable enters the flush floor box 100 through the conduit secured to the base 106 in alignment with the opening formed by the removed knockout portion 146. In alternative embodiments, the communication cable is received between the leveling ring 108 and the cover 110 similar to the floor cable 102. The communication cable may or may not include a top shield 162. Accordingly, in further embodiments, the communication cable utilizes the one or more ears 160 of the leveling ring 108. For example, the top shield 162 of the communication cable may be attached to the one or more ears 160 of the leveling ring 108. However, in alternative embodiments, the communication cable does not utilize the ears 160 of the leveling ring 108.

In some embodiments, the communication cable is connected to an outlet via the transition block 144. Accordingly, the transition block 144 may be designed for floor cables 102 and/or communication cables. Further, depending upon the type of communication cable and/or how the communication cable is connected, the communication cable may utilize the discrete grounding location. However, in alternative embodiments, the communication cable does not utilize the discrete grounding location, which may include the grounding terminal 128 and the grounding tab 120.

Prior to installation of the flush floor box 100, the apertures 142 in the base 106 are covered on the exterior of the base 106 with one or more pieces of gasket 150 adhered to the base 106. The one or more pieces of gasket 150 prevent concrete from seeping into the base 106 through the apertures 142 during installation of the flush floor box 100.

Figure 7:
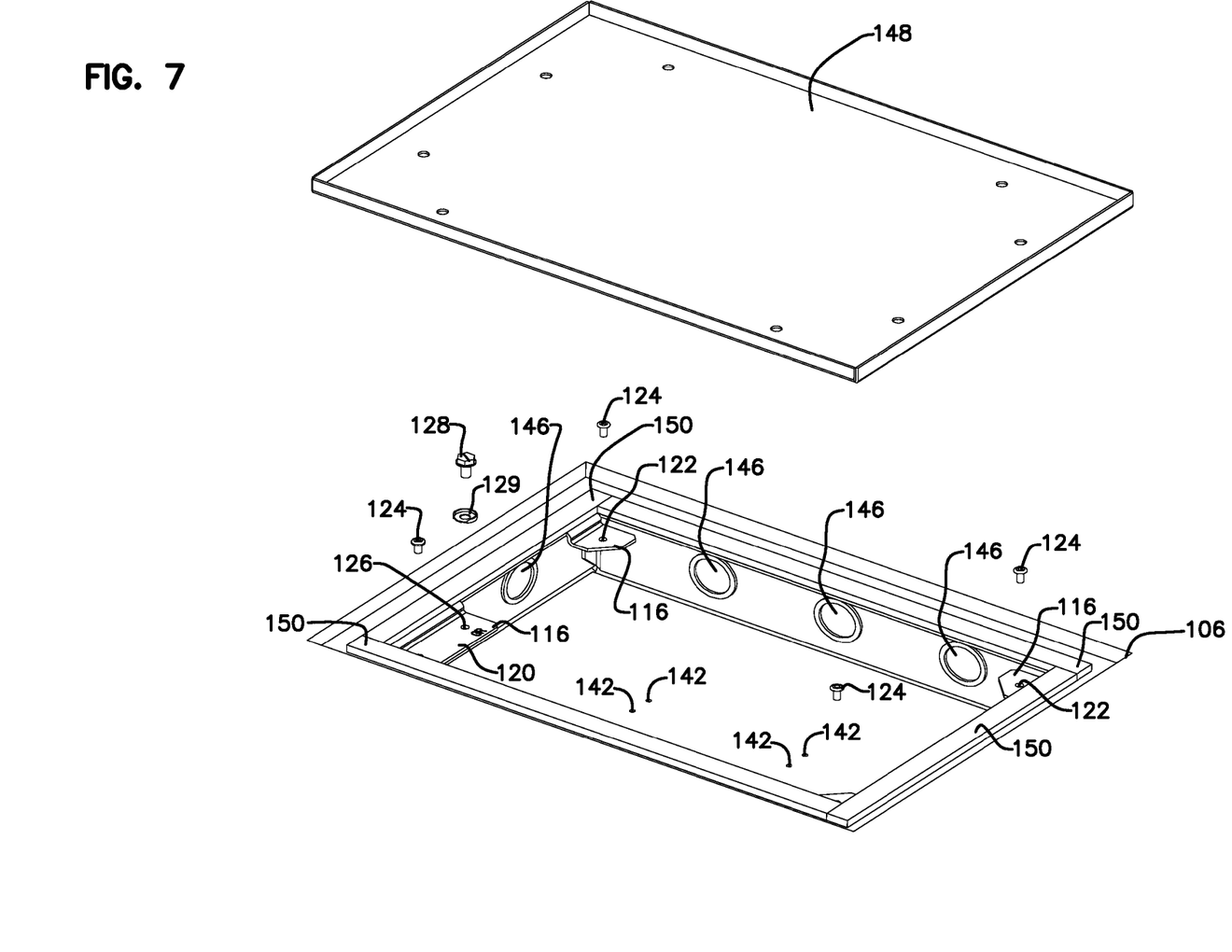
FIG. 7 is an isometric, exploded view of an embodiment of a base and a concrete shield of a flush floor box in accordance with the principles of the present disclosure.
Figure 8:
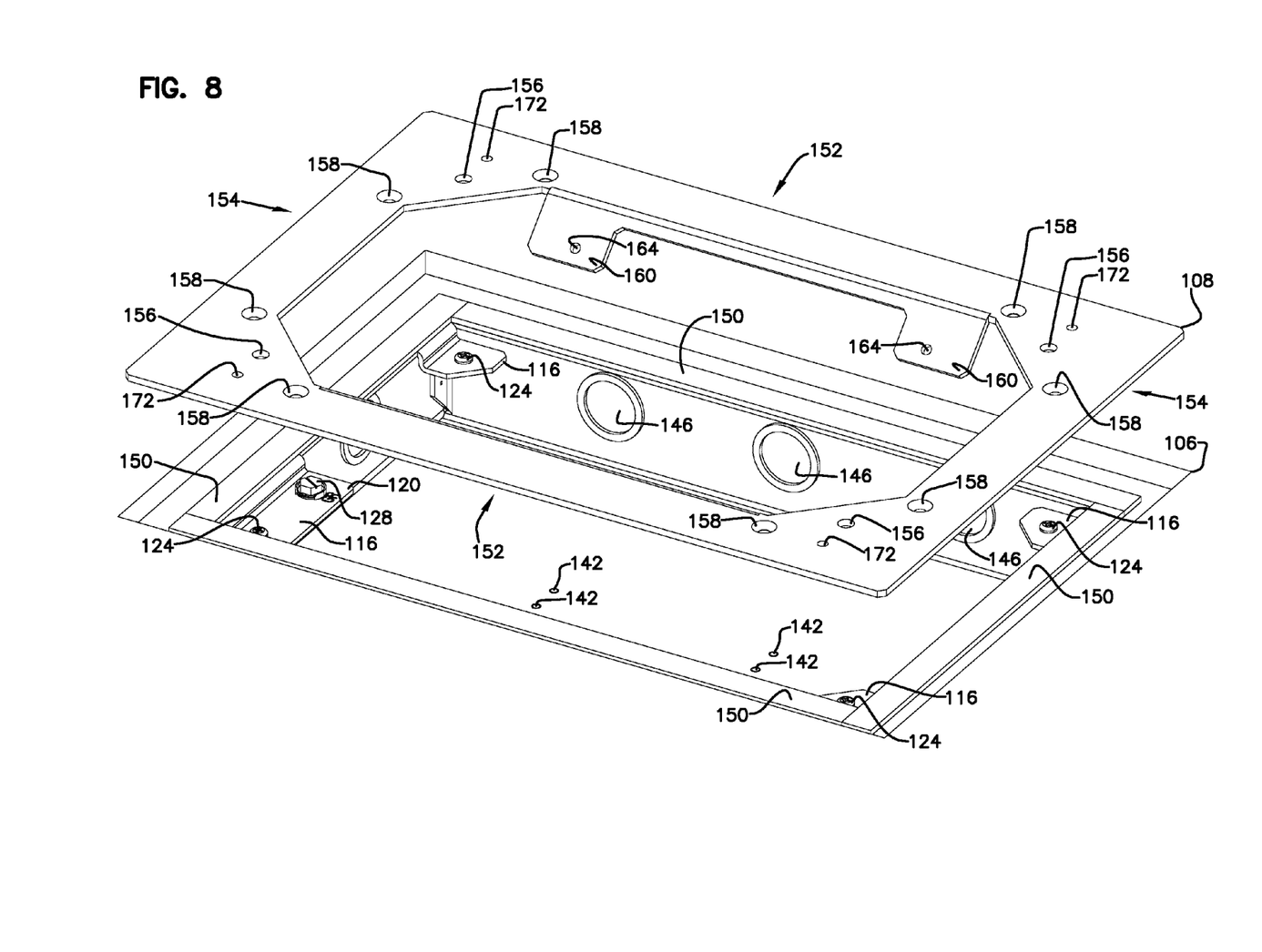
FIG. 8 is an isometric, exploded view of an embodiment of a base and a leveling ring of a flush floor box in accordance with the principles of the present disclosure.
Figure 9:
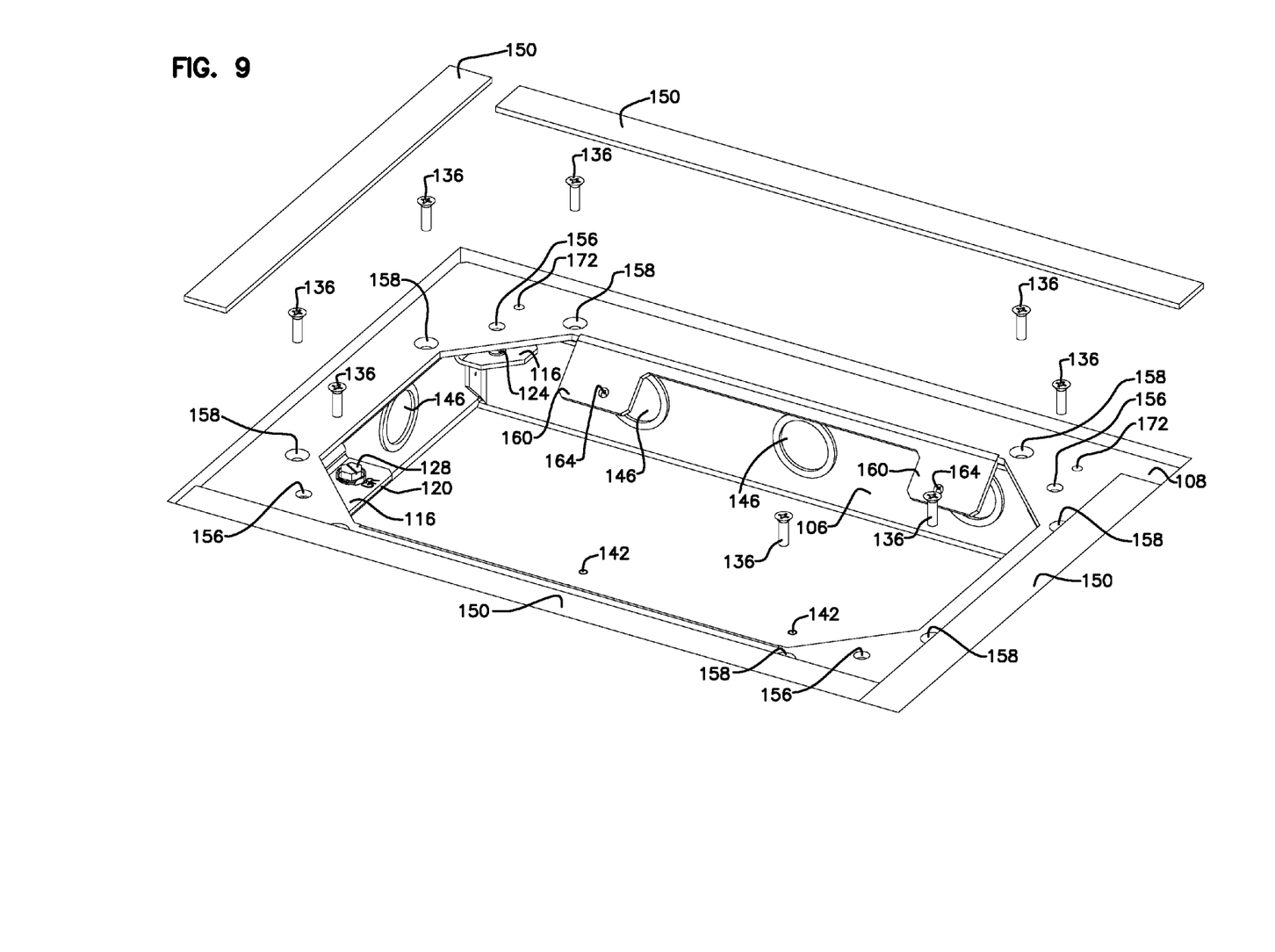
FIG. 9 is an isometric, exploded view of an embodiment of a base and a leveling ring of a flush floor box in accordance with the principles of the present disclosure.

During installation of the flush floor box 100, the base 106 is anchored to the ground/floor via floor screws 140. The screws can be selectively threaded in or out of their respective primary leveling tabs to provide primary leveling of the flush floor box 100. A temporary concrete shield 148 is secured/fastened onto base 106 (see FIG. 7). The shield 148 can include an upwardly extending lip that extends around a perimeter of the shield 148 to provide a recess in the concrete for later receiving the leveling ring 108 and the top cover 110 after the concrete has cured. In some embodiments, one or more gaskets 150 are disposed between the base 106 and the concrete shield 148. The concrete shield 148 once attached to the base 106 is concrete tight and does not allow concrete to seep into the interior of the base 106. A level may be utilized to ensure that the base 106 is level. The floor screws 140 may be used to adjust the height of the base 106 to provide primary leveling of the base 106. Once the base 106 has been leveled and secured, concrete is poured around the base 106 and concrete shield 148. After the concrete sets/cures, the concrete shield 148 is removed from the base 106. In some embodiments, the concrete shield 148 is disposable after one or multiple uses. During installation, the leveling screws 124 may be at least partially screwed into apertures 122 of the inner/corner tabs 116 of the base 106 before or after the pouring of the concrete around the base 106.

After the concrete has cured and the concrete shield 148 has been removed, the leveling ring 108 is placed on top of the base 106. In some embodiment, one or more gaskets 150 are placed between the leveling ring 108 and the base 106.

The leveling ring 108 includes a leveling screw access opening 156 for each leveling screw 124. The leveling screw access openings 156 align with the leveling screws 124 threaded into the screw apertures 122 of the inner tabs 116 of the base 106. For example, FIGS. 1, 2, 7, 9, 10 and 11 show four leveling screw access openings 156 aligned over four leveling screws 124. The leveling screw access openings 156 are smaller than heads of the leveling screws 124 such that of the leveling ring 108 rests on top of the heads of the leveling screws 124. Accordingly, the height of the leveling ring 108 is adjusted by threading the leveling screws 124 into and/or out of the screw apertures 122 of the corner tabs 116 of the base 106. Unthreading a leveling screw 124 from its respective tab 116 increases the height of the leveling ring 108 above that leveling screw 124. Threading a leveling screw 124 farther into its respective inner tab 116 decreases the height of the leveling ring 108 above that leveling screw 124. Accordingly, the height of the leveling ring 108 can be adjusted via the leveling screws 124 until the flush floor box 100 is flush with the floor and/or until the leveling ring 108 is level.

The leveling screw access openings 156 are sized to allow a technician to reach the leveling screws 124 through the leveling ring 108. Therefore, the leveling screw access openings 156 provide access to the tops of the leveling screws 124 while the leveling ring 108 rests on top of the leveling screws 124. For example, the openings 156 may be large enough to allow a screw driver to pass through the openings 156 and the leveling ring 108 while being small enough to allow the leveling ring 108 to rest on top of the heads of the leveling screws 124. Accordingly, the leveling ring 108 can be adjusted and leveled without removing the leveling ring 108 from the base 106.

Once the leveling ring 108 has been installed to the desired height, the leveling ring 108 is fastened (i.e., secured, anchored) to the base 106 via the first screws 136. The first screws 136 pass through screw holes 158 on the leveling ring 108. The first screws 136 are received by apertures 132 in the base 106. Further, the first screws 136 create an electrical connection between the base 106 and the leveling ring 108 for grounding purposes. In some embodiments, the leveling ring 108 is attached to the base 106 with at least eight first screws 136. Further, as discussed above, the apertures 132 may include supplemental support/reinforcement.

The leveling ring 108 is rectangular with two major sides 152 and two minor sides 154. The leveling ring 108 further includes two or more ears 160 (i.e., top shield grounding tabs). In some embodiments, the two or more ears 160 are located on the major side 152 of the leveling ring 108. In further embodiments, each major side 152 includes two ears 160. In additional embodiments, the ears 160 are integral with the leveling ring 108. The ears 160 may project inwardly from a main body of the rectangular leveling ring 108. Also, the two or more ears 160 may be angled downwardly to provide space for entry of the floor cable 102 or communication cable, as illustrated in FIGS. 1, 2, 4-6, and 8-11. Such downward angling can prevent the floor cable 102 and/or communication cable from being kinked or otherwise excessively bent as the floor cable 102 and/or communication cable is routed into the box 100. The two or more ears 160 are configured to electrically connect a top shield 162 of the floor cable 102 and/or communication cable to the leveling ring 108 which is electrically bonded to the base 106 via the first screws 136. In some embodiments, the two pairs of ears 160 are configured to electrically connect two different top shields 162 of two different floor cables 102 and/or communication cables to the flush floor box 100 (e.g., a separate cable can be routed into the box 100 at each major side of the box 100). The two or more ears 160 may be configured to physically connect a top shield 162 of the floor cable 102 and/or communication cable to the flush floor box 100 via a fastening mechanism. The fastening mechanism can include structure such as shield screws 166 and/or bonding clips 168. In some embodiments, the ears 160 include screw apertures 164. In these embodiments, the top shield 162 can be connected to a pair of ears 160 of the leveling ring 108 via two shield screws 166 that are received in screw apertures 164 (see FIG. 11). In alternative embodiments, the top shield 162 is connected to a pair of ears 160 via bonding clips 168 (see FIG. 10). The connection created by the fastening mechanism is both a physical/mechanical and an electrical connection for providing electrical bonding.

In some embodiments, a transition block 144 is placed on top of the floor cable 102 or communication cable within the flush floor box 100. In some embodiments, the flush floor box 100 includes two or more transition blocks 144 each placed over a different floor cable 102 within the flush floor box 100. As discussed above, in some embodiments, the transition block 144 attaches to the base 106 via transition block screws 143. In other embodiments, the transition block 144 attached to the base 106 via an adhesive or tape. The transition block 144 electrically connects the floor cable 102 or the communication cable to the flush floor box 100. For example the transition block 144 electrically connects to wires 182 located inside the floor cable 102 via one or more connectors 170. In some embodiments, the connectors 170 are connector screws as illustrated in FIGS. 10 and 11. The floor cable 102 includes several different wires 182 such as a plurality of hot/live wires, a neutral wire, and/or a ground wire. The centermost connector 170 typically connects to the ground wire of the floor cable 102.

Intermediate wires 180 may connect desired components of the flush floor box 100 to the connectors 170 of the transition block 144 which electrically connects the desired components to the wires 182 in the floor cable 102. In one example, the ground wire of the floor cable 102 is electrically connected to the base 106 via an intermediate wire 180 that extends from the center connector 170 of the transition block 144 to the grounding terminal 128 of the base 106. In another example, intermediate wires 180 connect a power outlet secured to the cover 110 to hot and neutral wires of the floor cable 102 via the one or more connectors 170 of the transition block 144.

The cover 110 is placed on top of the leveling ring 108 after the floor cable 102 has been attached to the leveling ring 108 or the communication cable has been attached to the flush floor box 100. In some embodiments, one or more gaskets 150 are placed between the leveling ring 108 and the cover 110. The cover 110 is fastened to the base 106 via second screws 138. The second screws 138 pass through apertures 172 on the leveling ring 108 prior to engaging the apertures 130 on the base 106. As discussed above, the apertures 130 may include supplemental supports/reinforcement. In one embodiment, the cover 110 is anchored with at least four second screws 138. The second screws 138 can electrically connect the cover 110 to the base 106 and/or the leveling ring 108 for grounding/electrical bonding purposes.

Gaskets 150 help to seal the box 100. In some embodiments, the gaskets 150 create a water tight seal in the box 100. For example the gaskets 150 prevent cleaners and water utilized on floors from entering the boxes 100.

The cover 110 covers at least a portion of the base 106 and the leveling ring 108. The cover 110 includes at least one outlet port for installing at least one outlet. The outlet is attached to outlet ears located on the outlet port. The outlet port in the cover 110 and/or an installed outlet may be covered up with one or more outlet covers 174 as illustrated in FIGS. 1 and 2. For example, the flush floor box 100 may include two outlets and two outlet covers 174 as illustrated in FIG. 2. In an alternative example, the cover 110 includes one outlet and one outlet cover 174. In another example, the flush floor box 100 includes at least one outlet port for one or more outlets but has no outlets actually installed. In this example, the one or more outlet ports are still covered by one or more outlet covers 174. Further, whether the outlet is installed or not, an outlet gasket 104 may be placed between the outlet port and the outlet cover 174 to help seal the outlet port. The one or more outlets and the one or more outlet covers 174 are both anchored to the cover 110 via a set of screws. In one embodiment, the outlet cover 174 and/or the outlets are anchored to the cover 110 via the same set of screws.

Numerous features of the flush floor box 100 help to reduce the overall cost of the flush floor box 100. For example, several features of the base 106 may be integral with the base 106 of the flush floor box 100 and do not require the time and expense of welding, such as the one or more inner tabs 116, grounding tab 120, and/or the one or more flanges 131. In a further example, the two or more ears 160 may be integral with leveling ring 108 and do not require the use of welding. Also, in another example, the apertures 142 for connecting the transition block 144 are formed directly through the base 106 and do not require a separate piece to be welded onto the base 106.

Numerous other changes may be made which will readily suggest themselves to those skilled in the art and which are encompassed in the spirit of the disclosure and/or as defined in the claims. While various embodiments have been described for purposes of this disclosure, various changes and modifications may be made which are well within the scope of the present disclosure.

What is claimed is:

1. A flush floor box comprising:
   a base rectangular housing including integral corner tabs in each corner of the base;
   leveling screws threaded into the integral corner tabs;
   a rectangular leveling ring including leveling screw access openings and at least two integral ears that project inwardly from a main body of the rectangular leveling ring, the at least two integral ears are configured to connect to a top shield of a floor cable for electrically connecting the top shield of the floor cable to the rectangular leveling ring,
   wherein the leveling ring rests on the leveling screws and the leveling screw access openings are configured to provide access through the rectangular leveling ring to tops of the leveling screws, and
   wherein the leveling screws are configured to raise or lower the rectangular leveling ring relative to the base while the rectangular leveling ring rests on the leveling screws;
   first fasteners that secure the rectangular leveling ring to the base; and
   a rectangular cover that mounts over the rectangular leveling ring and forms a top side of the flush floor box.

2. The flush floor box of claim 1, wherein the rectangular leveling ring is electrically connected to the base for grounding purposes, and wherein at least one of the integral corner tabs includes a discrete grounding location for electrically connecting the base to a ground fault current path.

3. The flush floor box of claim 2, further comprising at least one transition block attached to the base, wherein the at least one transition block is configured to connect to wires contained in the floor cable.

4. The flush floor box of claim 3, wherein an intermediate wire extends from the discrete grounding location to a connector of the at least one transition block that is electrically connected to a ground wire in the floor cable.

5. The flush floor box of claim 3, further comprising at least one outlet anchored to the rectangular cover and electrically connected to the floor cable via the at least one transition block.

6. The flush floor box of claim 1, wherein at least one first gasket is located between the rectangular leveling ring and the base and at least one second gasket is located between the rectangular leveling ring and the rectangular cover.

7. The flush floor box of claim 1, wherein the at least two integral ears are angled downwardly and are configured to fasten the top shield electrically and physically to the rectangular leveling ring via a fastening mechanism selected from a group of consisting of screws and bonding clips.

8. The flush floor box of claim 2, wherein the first fasteners electrically connect the rectangular leveling ring to the base for grounding purposes, and wherein the base includes primary leveling screws and primary leveling tabs for providing primary leveling of the flush floor box.

9. A flush floor box comprising:
a base including a plurality of inner tabs;
leveling screws threaded through the inner tabs;
a leveling ring that seats on the leveling screws, the leveling ring including at least two ears, the at least two ears being configured to attach to a top shield of a floor cable for electrically connecting the top shield of the floor cable to the leveling ring for grounding purposes; and
a top cover that mounts over the leveling ring and the base and that forms a top side of the flush floor box.

10. The flush floor box of claim 9, wherein the plurality of inner tabs are integral with the base, wherein the inner tabs are positioned adjacent corners of the base, and wherein at least one of the inner tabs includes a discrete grounding location for electrically connecting the base to a ground fault current path.

11. The flush floor box of claim 9, wherein the at least two ears are integral with the leveling ring.

12. The flush floor box of claim 9, further comprising at least one transition block attached to the base, wherein the at least one transition block connects to wires contained in the floor cable.

13. The flush floor box of claim 12, wherein an intermediate wire electrically connects a ground wire in the floor cable to a discrete grounding location via the at least one transition block.

14. The flush floor box of claim 12, further comprising at least one power outlet secured to the top cover and configured to electrically connect to the floor cable via the at least one transition block.

15. The flush floor box of claim 12, wherein the base includes a knockout portion.

16. The flush floor box of claim 9, further comprising at least 8 fasteners for securing the leveling ring to the base.

17. The flush floor box of claim 9, further comprising at least one first gasket located between the leveling ring and the base and at least one second gasket located between the leveling ring and the top cover.

18. The flush floor box of claim 9, wherein the top shield is electrically and physically connected to the at least two ears via a fastening mechanism selected from a group consisting of screws and bonding clips.

19. The flush floor box of claim 9, wherein the top cover includes at least one outlet port and at least one outlet cover.

20. The flush floor box of claim 9, wherein the base includes at least one flange integral with the base, wherein the at least one flange defines first openings for receiving first fasteners for securing the leveling ring to the base and second openings for receiving second fasteners for securing the top cover to the base.

* * * * *